(12) United States Patent
Ogata et al.

(10) Patent No.: US 7,840,114 B2
(45) Date of Patent: Nov. 23, 2010

(54) VIDEO AND AUDIO REPRODUCING APPARATUS AND METHOD OF REPRODUCING THE SAME

(75) Inventors: Satoshi Ogata, Kanagawa (JP);
Mamoru Araya, Tokyo (JP); Hisashi Fukugawa, Tokyo (JP)

(73) Assignee: Panasonic Corporation, Osaka (JP)

( * ) Notice: Subject to any disclaimer, the term of this patent is extended or adjusted under 35 U.S.C. 154(b) by 1072 days.

(21) Appl. No.: 11/581,344

(22) Filed: Oct. 17, 2006

(65) Prior Publication Data

US 2007/0092219 A1    Apr. 26, 2007

(30) Foreign Application Priority Data

Oct. 21, 2005   (JP) .............................. 2005-307268
Jul. 10, 2006   (JP) .............................. 2006-189215

(51) Int. Cl.
*H04N 5/91* (2006.01)
(52) U.S. Cl. ......................................... 386/68; 386/46
(58) Field of Classification Search ................... 386/46, 386/68–70, 124–126
See application file for complete search history.

(56) References Cited

U.S. PATENT DOCUMENTS 6,304,538 B1 * 10/2001 Hayashi .................. 369/59.22

6,728,469 B1    4/2004  Okazaki et al.
2003/0068158 A1  4/2003  Kudou
2005/0117889 A1 * 6/2005  Seita ........................... 386/95

FOREIGN PATENT DOCUMENTS

| JP | 10-126743 | 5/1998 |
|----|-----------|--------|
| JP | 11-275518 | 10/1999 |
| JP | 2003-91934 | 3/2003 |

* cited by examiner

*Primary Examiner*—Thai Tran
*Assistant Examiner*—Mishawn Dunn
(74) *Attorney, Agent, or Firm*—McDermott Will & Emery LLP

(57) ABSTRACT

The designated double speed number n is corrected by a ratio of a reproducing time of a VOBU calculated from the difference between VOBU_E_PTM and VOBU_S_PTM included in management information NV_PCK (navigation back) of the VOBU and a standard reproducing time (0.5 second) (S104), and an address of VOBU_SRI included in the VOBU of the recorded data is referred to by representing the corrected designation double speed number i as an exponent to obtain a VOBU to be subsequently reproduced (S109) The VOBU_SRI is referred to by representing the corrected designated double speed number i as the exponent, and an address of the VOBU to be subsequently reproduced can be obtained. Therefore, accurate reproducing speed can be achieved.

16 Claims, 12 Drawing Sheets

FIG. 3

CONTENT OF PCI

|  | CONTENT |
|---|---|
| PCI_GI | GENERAL PCI INFORMATION |
| NSML_AGLI | NON-SEAMLESS ANGLE INFORMATION |
| HLI | HIGH LIGHT INFORMATION |
| RECI | RECORDING INFORMATION |

FIG. 4

CONTENT OF PIC_GI

|  | CONTENT |
|---|---|
| NV_PCK_LBN | LBN OF NAVIGATION BACK |
| VOBU_CAT | CATEGORY OF VOBU |
| VOBU_UOP_CTL | USER OPERATION LIMIT OF VOBU |
| VOBU_S_PTM | START PTM OF VOBU |
| VOBU_E_PTM | END PTM OF VOBU |
| VOBU_SE_E_PTM | SEQUENCE END PTM OF VOBU |
| C_ELTM | CELL PASSAGE TIME |

FIG. 5

CONTENT OF DSI

|  | CONTENT |
|---|---|
| DSI_GI | GENERAL DSI INFORMATION |
| SML_PBI | SEAMLESS PLAYBACK INFORMATION |
| SML_AGLI | SEAMLESS ANGLE INFORMATION |
| VOBU_SRI | VOBU SEARCH INFORMATION |
| SYNCI | SYNCHRONIZATION INFORMATION |

FIG. 6

VOBU_SRI

| | CONTENT |
|---|---|
| FWDI VIDEO | ADDRESS OF SUBSEQUENT VOBU HAVING VIDEO DATA |
| FWDI 240 | START ADDRESS OF VOBU AFTER 120 SECONDS |
| FWDI 120 | START ADDRESS OF VOBU AFTER 60 SECONDS |
| FWDI 60 | START ADDRESS OF VOBU AFTER 30 SECONDS |
| FWDI 20 | START ADDRESS OF VOBU AFTER 10 SECONDS |
| FWDI 15 | START ADDRESS OF VOBU AFTER 7.5 SECONDS |
| FWDI 14 | START ADDRESS OF VOBU AFTER 7.0 SECONDS |
| ⋮ | ⋮ |
| FWDI 4 | START ADDRESS OF VOBU AFTER 2.0 SECONDS |
| FWDI 3 | START ADDRESS OF VOBU AFTER 1.5 SECONDS |
| FWDI 2 | START ADDRESS OF VOBU AFTER 1.0 SECOND |
| FWDI 1 | START ADDRESS OF VOBU AFTER 0.5 SECONDS |
| FWDI NEXT | START ADDRESS OF SUBSEQUENT VOBU |
| FWDI PREV | START ADDRESS OF PREVIOUS VOBU |
| BWDI 1 | START ADDRESS OF VOBU BEFORE 0.5 SECONDS |
| BWDI 2 | START ADDRESS OF VOBU BEFORE 1.0 SECONDS |
| BWDI 3 | START ADDRESS OF VOBU BEFORE 1.5 SECOND |
| BWDI 4 | START ADDRESS OF VOBU BEFORE 2.0 SECONDS |
| ⋮ | ⋮ |
| BWDI 14 | START ADDRESS OF VOBU BEFORE 7.0 SECOND |
| BWDI 15 | START ADDRESS OF VOBU BEFORE 7.5 SECOND |
| BWDI 20 | START ADDRESS OF VOBU BEFORE 10 SECOND |
| BWDI 60 | START ADDRESS OF VOBU BEFORE 30 SECONDS |
| BWDI 120 | START ADDRESS OF VOBU BEFORE 60 SECOND |
| BWDI 240 | START ADDRESS OF VOBU BEFORE 120 SECOND |
| BWDI VIDEO | ADDRESS OF PREVIOUS VOBU HAVING VIDEO DATA |

FIG. 9

VTS_TMAPTI

|  | CONTENT |
|---|---|
| VTS_TMAP_Ns | NUMBER OF VTS_TMAP |
| VTS_TMAPT_EA | END ADDRESS OF VTS_TMAPT |

FIG. 10

VTS_TMAP_SRP

|  | CONTENT |
|---|---|
| VTS_TMAP_SA | START ADDRESS OF VTS_TMAP |

FIG. 11

VTS_TMAP

|  | CONTENT |
|---|---|
| TMU | TIME UNIT (SECOND) |
| MAP_EN_Ns | NUMBER OF MAP ENTRY |
| MAP_ENT | TABLE OF MAP ENTRY |

VIDEO AND AUDIO REPRODUCING APPARATUS AND METHOD OF REPRODUCING THE SAME

BACKGROUND OF THE INVENTION

1. Field of the Invention

The present invention relates to a video and audio reproducing apparatus that reproduces and outputs video data and audio data recorded on a recording medium, such as an optical disk or the like, at a fast speed in a forward direction or a backward direction, and a method thereof.

2. Description of the Related Art

Generally, a recording medium in which video or audio, and sub-video are encoded according to a DVD-Video standard and then compressed and recorded, and a reproducing apparatus thereof have been put into practical use. In this reproducing apparatus, not only common reproducing but also special reproducing, such as forward reproducing at a fast speed or backward reproducing at a fast speed, can be performed. According the DVD-Video standard, in a VOBU (Video Object Unit) that is a logical minimal reproducing unit, navigation data (NV_PCK) for controlling reproducing of the VOBU as shown in FIG. 2 is recorded, in addition to presentation data like video data (V_PCK) or audio data (A_PCK) or sub-picture data (SP_PCK).

As shown in FIG. 3, PCI_GI (general information of PCI), NSML_AGLI (non-seamless angle information), HLI (highlight information), and RECI (recording information) are included in the navigation data (NV_PCK). Further, as shown in FIG. 5, DSI_GI (general information of DSI), SML_PBI (seamless playback information), SML_AGLI (seamless angle information), VOBU_SRI (VOBU search information), and SYNCI (synchronization information) are included in the navigation data (NV_PCK). As shown in FIG. 6, in the VOBU-SRI, start addresses of the VOBU that are reproduced before and after 0.5×N seconds (N indicates integers of from 1 to 15) including right before or right after reproducing the VOBU, 10 seconds, 30 seconds, 60 seconds, and 120 seconds, are described.

The forward reproducing at a fast speed and the backward reproducing at a fast speed can be achieved by intermittently reproducing the VOBU by the VOBU_SRI, and the fast reproducing speed can be adjusted by varying the referencing location in the VOBU_SRI. That is, if the reproducing time of the VOBU is 0.5 second, the interval of the VOBU_SRI is also a unit of the 0.5 second. When forward reproducing at double speed is performed, an address of the VOBU reproduced after 1 second if N=2 is acquired from the VOBU_SRI to reproduce it, and when forward reproducing at quadruple speed is performed, an address of the VOBU reproduced after 2 seconds if N=4 is acquired from the VOBU_SRI to reproduce it (for example, see JP-A-10-126743)

However, since the reproducing time of the VOBU determined according to the DVD-Video standard is within a range of 0.4 to 1.2 seconds, it is not constant. Since the time interval at which the description is made in the VOBU_SRI is 0.5 second, if the referencing location in the VOBU_SRI is fixed at a fast speed, the accurate speed cannot be obtained. For example, in a case in which 2× reproducing is performed, even when an address of the VOBU reproduced after one second as N=2 is acquired and reproducing is performed, if the reproducing time of the VOBU is one second, it may become actually common reproducing. Similar to it, in a case in which 4× reproducing is performed, even when an address of the VOBU reproduced after 2 second as N=4 is acquired and reproducing is performed, if the reproducing time of the VOBU is one second, it may become actually the reproducing at 2×.

SUMMARY OF THE INVENTION

Accordingly, it is an object of the invention to provide a method of reproducing video and audio and an apparatus thereof, in which in a case in which video data or audio data recorded on a recording medium according to a DVD-Video standard is reproduced and outputted at a fast speed in a forward or backward direction, even when a reproducing time of a VOBU is not constant, accurate reproducing speed can be obtained.

In order to achieve the above-mentioned object, according to a first aspect of the invention, there is provided a video and audio reproducing apparatus that performs double speed reproducing of video and audio on the basis of the designated double speed number of recorded data according to a DVD-Video standard. The video and audio reproducing apparatus includes a correcting unit that corrects the designated double speed number according to a ratio of a reproducing time of a VOBU (Video Object Unit) calculated from the difference between VOBU_E_PTM and VOBU_S_PTM included in the VOBU of the recorded data, and a standard reproducing time (0.5 second); and a VOBU acquiring unit that refers to an address of VOBU_SRI included in the VOBU of the recorded data by representing a correction value of the designated double speed number as an exponent, and acquires a VOBU to be subsequently reproduced.

According to this configuration, the designated double speed number is corrected by the reproducing time of the VOBU calculated from the information included in the VOBU, the address of the VOBU_SRI is referred to by representing the corrected designated double speed number as the exponent, and the address of the VOBU to be subsequently reproduced can be obtained. Even when the reproducing time of the VOBU is not 0.5 second to be the standard reproducing time, the correct reproducing speed can be obtained.

According to a second aspect of the invention, there is provided a video and audio reproducing apparatus that performs double speed reproducing of video and audio on the basis of the designated double speed number of recorded data according to a DVD-Video standard. The video and audio reproducing apparatus includes a correcting unit that corrects the designated double speed number according to a ratio of a fixed value given as a reproducing time of a VOBU (Video Object Unit) and a standard reproducing time (0.5 second), and a VOBU acquiring unit that refers to an address of VOBU_SRI included in the VOBU of the recorded data by representing a correction value of the designated double speed as an exponent, and acquires a VOBU to be subsequently reproduced.

According to this configuration, the designated double speed number is corrected by a fixed value given as a reproducing time of VOBU, the address of the VOBU_SRI is referred to by representing the corrected designated double speed number as the exponent, and the address of the VOBU to be subsequently reproduced can be obtained. Even when the reproducing time of the VOBU is not 0.5 second to be the standard reproducing time, the correct reproducing speed can be obtained.

According to a third aspect of the invention, there is provided a video and audio reproducing apparatus that performs double speed reproducing of video and audio on the basis of the designated double speed number of recorded data according to a DVD-Video standard. He video and audio reproducing apparatus includes an absolute time calculating unit that calculates an absolute time of a VOBU (Video Object Unit) to be subsequently reproduced from a value obtained by multiplexing a reproducing time of a VOBU calculated from the difference between VOBU_E_PTM and VOBU_S_PTM included in the VOBU of the recorded data by the designated double speed number, and a current passage time, and a VOBU acquiring unit that refers to an address of MAP_EN of MAP_ENT included in VTSI of the recorded data by representing a value obtained by dividing the absolute time of the VOBU by TMU included in the VTSI of the recorded data as an exponent, and acquires a VOBU to be subsequently reproduced.

According to this configuration, the absolute time of the VOBU to be subsequently reproduced is calculated by multiplexing the reproducing time of the VOBU calculated from the information included in the VOBU by the designated double speed number, the address of the MAP_ENT is referred to by representing the value obtained by dividing the absolute time by the TMU as the exponent, and the address of the VOBU to be subsequently reproduced can be obtained from the MAP_EN. Even when the reproducing time of the VOBU is not 0.5 second to be the standard reproducing time, the accurate reproducing speed can be obtained.

According to a fourth aspect of the invention, there is provided a video and audio reproducing apparatus that performs double speed reproducing of video and audio on the basis of the designated double speed number of recorded data according to a DVD-Video standard. The video and audio reproducing apparatus includes an absolute time calculating unit that calculates an absolute time of a VOBU (Video Object Unit) to be subsequently reproduced from a value obtained by multiplexing a fixed value given as a reproducing time of a VOBU by the designated double speed number, and a current passage time, and a VOBU acquiring unit that refers to MAP_EN of MAP_ENT included in VTSI of the recorded data by representing a value obtained by dividing the absolute time of the VOBU by TMU included in the VTSI of the recorded data as an exponent, and acquires a VOBU to be subsequently reproduced.

According to this configuration, the absolute time of the VOBU to be subsequently reproduced is calculated by multiplexing a fixed value given as the reproducing time of the VOBU by the designated double speed number, the address of the MAP_ENT is referred by representing the value obtained by dividing the absolute time by the TMU as the exponent, and the address of the VOBU to be subsequently reproduced can be obtained from the MAP_EN. Even when the reproducing time of the VOBU is not 0.5 second to be the standard reproducing time, the accurate reproducing speed can be obtained.

According to a fifth aspect of the invention, there is provided a video and audio reproducing apparatus that performs double speed reproducing of video and audio on the basis of the designated double speed number of recorded data according to a DVD-Video standard. The video and audio reproducing apparatus includes a correcting unit that corrects the designated double speed number according to a ratio of a reproducing time of a VOBU calculated by the difference between VOBU_E_PTM and VOBU_S_PTM included in the VOBU of the recorded data, and a standard reproducing time (0.5 second), a VOBU acquiring unit that refers to an address of VOBU_SRI included in the VOBU of the recorded data by representing a correction value of the designated double speed as an exponent, and acquires a VOBU to be subsequently reproduced, an absolute time calculating unit that calculates an absolute time of a VOBU to be subsequently reproduced from a value obtained by multiplexing a reproducing time of the VOBU calculated from the difference between VOBU_E_PTM and VOBU_S_PTM included in the VOBU of the recorded data by the designated double speed number, and a current passage time, when the designated double speed number is the predetermined double speed number or more, and a VOBU acquiring unit that refers to an address of MAP_EN of MAP_ENT included in the VTSI of the recorded data by representing a value obtained by dividing the absolute time of the VOBU by TMU included in the VTSI of the recorded data as an exponent, and acquires a VOBU to be subsequently reproduced.

According to this configuration, when the designated double speed number is smaller than the predetermined double speed number, the designated double speed number is corrected by the reproducing time of the VOBU calculated from the information included in the VOBU, the address of the VOBU_SRI is referred to by representing the corrected double speed number as the exponent, and the address of the VOBU to be subsequently reproduced is obtained. When the designated double speed number is equal to or greater than the predetermined double speed number, the absolute value of the VOBU to be subsequently reproduced is calculated by multiplexing the reproducing time of the VOBU calculated from the information included in the VOBU by the designated double speed number, the address of the MAP_ENT is referred to by representing the value obtained by dividing the absolute time by the TMU as the exponent, and the address of the VOBU to be subsequently reproduced is obtained from the MAP_EN. Therefore, even when the reproducing time of the VOBU is not 0.5 second to be the standard reproducing time, the accurate reproducing speed can be obtained.

According to a sixth aspect of the invention, there is provided a video and audio reproducing apparatus that performs double speed reproducing of video and audio on the basis of the designated double speed number of recorded data according to a DVD-Video standard. The video and audio reproducing apparatus includes a correcting unit that corrects the designated double speed number according to a ratio of a fixed value given as a reproducing time of a VOBU and a standard reproducing time (0.5 second), a VOBU acquiring unit that refers to an address of VOBU_SRI included in the VOBU of the recorded data by representing a correction value of the designated double speed number as an exponent, and acquires a VOBU to be subsequently reproduced, an absolute time calculating unit that calculates an absolute time of a VOBU to be subsequently reproduced from a value obtained by multiplexing a fixed value given as a reproducing time of the VOBU by the designated double speed number, and a current passage time, when the designated double speed number is equal to greater than the predetermined double speed number, and a VOBU acquiring unit that refers to MAP_EN of MAP_ENT included in VTSI of the recorded data by representing a value obtained by dividing the absolute time of the VOBU by TMU included in the VTSI of the recorded data as an exponent, and acquires a VOBU to be subsequently reproduced.

According to this configuration, when the designated double speed number is smaller than the predetermined double speed number, the designated double speed number is corrected by the fixed value given as the reproducing time of the VOBU, the VOBU_SRI is referred to by representing the corrected designated double speed number as the exponent, and the address of the VOBU to be subsequently reproduced is obtained. When the designated double speed number is equal to or greater than the predetermined double speed number, the absolute value of the VOBU to be subsequently reproduced is calculated by multiplexing the fixed value given as the reproducing time of the VOBU by the designated double speed number, the MAP_ENT is referred to by representing the value obtained by dividing the absolute time by the TMU as the exponent, and the address of the VOBU to be subsequently reproduced is obtained from the MAP_EN. Therefore, even when the reproducing time of the VOBU is not 0.5 second to be the standard reproducing time, the accurate reproducing speed can be obtained.

According to the aspects of the invention, when the video data or the audio data recorded in the recording medium according to the DVD-Video standard is reproduced and outputted at a fast speed in a forward or backward direction, the reproducing time of the VOBU is acquired from the management information, or the reproducing time of the VOBU is fixed, and thus the accurate exponent can be calculated for obtaining the address of the VOBU to be subsequently reproduced. Accordingly, even when the reproducing time of the VOBU is not constant, the accurate reproducing speed can be obtained.

BRIEF DESCRIPTION OF THE DRAWINGS

FIG. 3 is a diagram illustrating PCI included in NV_PCK of a header of VOBU.

FIG. 4 is a diagram illustrating PCI_GI included in PCI.

FIG. 5 is a diagram illustrating DSI included in NV_PCK of a header of VOBU.

FIG. 6 is a diagram illustrating VOBU_SRI included in DSI.

FIG. 9 is a diagram illustrating VTS_TMAPTI included in VTS_TMAPT.

FIG. 10 is a diagram illustrating VTS_TMAP_SRP included in VTS_TMAPT.

FIG. 11 is a diagram illustrating VTS_TMAP included in VTS_TMAPT.

DESCRIPTION OF THE PREFERRED EMBODIMENTS

First Embodiment

Figure 1:
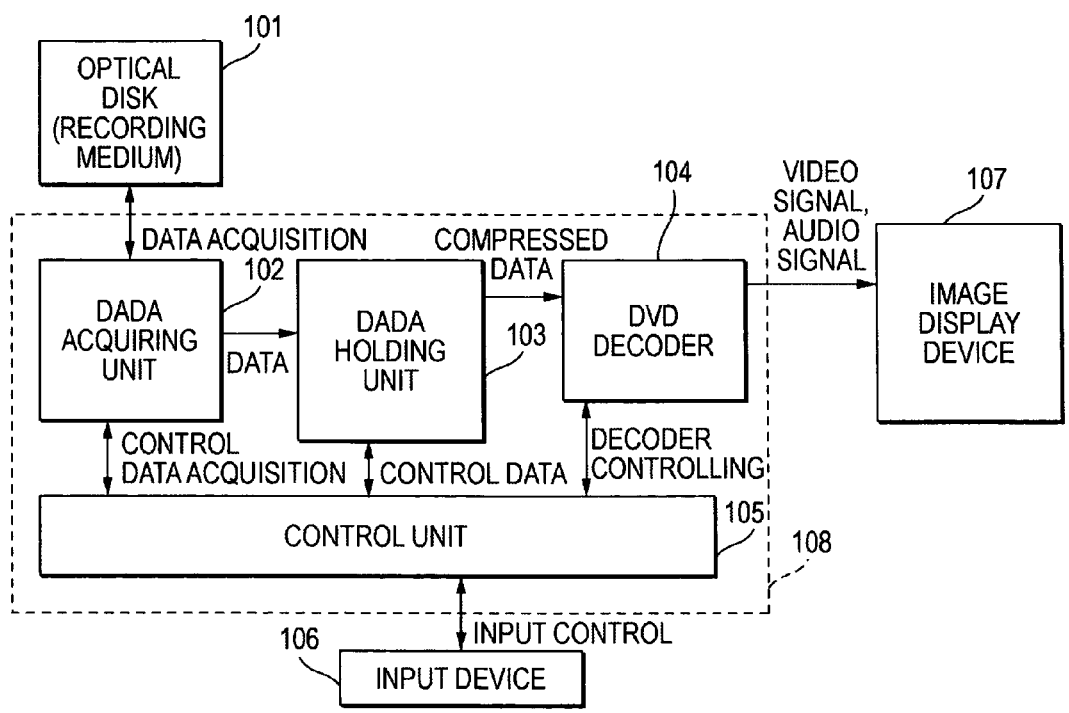
FIG. 1 is a diagram illustrating a video reproducing apparatus according to an embodiment of the invention.

FIG. 1 is a block diagram illustrating a structure of a video reproducing apparatus according to an embodiment of the invention. In FIG. 1, reference numeral 101 indicates an optical disk that serves as a recording medium, reference numeral 102 indicates a data acquiring unit, reference numeral 103 indicates a data holding unit, reference numeral 104 indicates a DVD decoding unit, reference numeral 105 indicates a control unit, reference numeral 106 indicates an input device, and reference numeral 107 indicates an image display unit.

In the optical disk 101, presentation data including compressed video data or audio data, and navigation data including attribute data or reproducing control data of the presentation data are recorded. The data acquiring unit 102 acquires the presentation data and the navigation data from the recording medium 101, and transmits them to the data holding unit 103. The data holding unit 103 holds the transmitted presentation data and navigation data, and transmits them to the DVD decoder 104. In accordance with the setting by the control unit 105, the DVD decoder 104 decodes the transmitted presentation data, and outputs it to the image display unit 107 as a video signal and an audio signal. The image display unit 107 outputs the video signal and the audio signal outputted by the DVD decoder 104 through a display or a speaker. The input device 106 includes a remote controller or a plurality of keys, and a user inputs instruction to the control unit through the input device 106. In accordance with the instruction inputted from the input device, the control unit 105 controls the data acquiring unit 102, the data holding unit 103, and the DVD decoder 104.

Further, a functional block of each of the data acquiring unit 102, the data holding unit 103, the DVD decoder 104, and the control unit 105 are typically implemented as an LSI to be an integrated circuit. Each of the functional blocks of the data acquiring unit 102, the data holding unit 103, the DVD decoder 104, and the control unit 105 may be constructed as one chip, and a portion or all of them may be constructed as one chip.

In this case, each functional block is implemented as the LSI, but it may be implemented as an IC, a system LSI, a super LSI, and an ultra LSI according to the components per chip.

Further, a method of forming an integrated circuit is not limited to the LSI, but it may be achieved by a dedicated circuit or a general-purpose processor. Specifically, a FPGA (Field Programmable Gate Array) in which programming can be made after manufacturing the LSI, or a reconfigurable processor in which connection or setting of circuit cells in the LSI is reconfigurable may be used.

Furthermore, if a technology for replacing the integrated circuit with the LSI is developed by the progress of the semiconductor technology or a derivative technology from the semiconductor technology, the integration of the functional blocks may be performed by using the technology. A biological technology has been newly suggested and developed.

Figure 2:
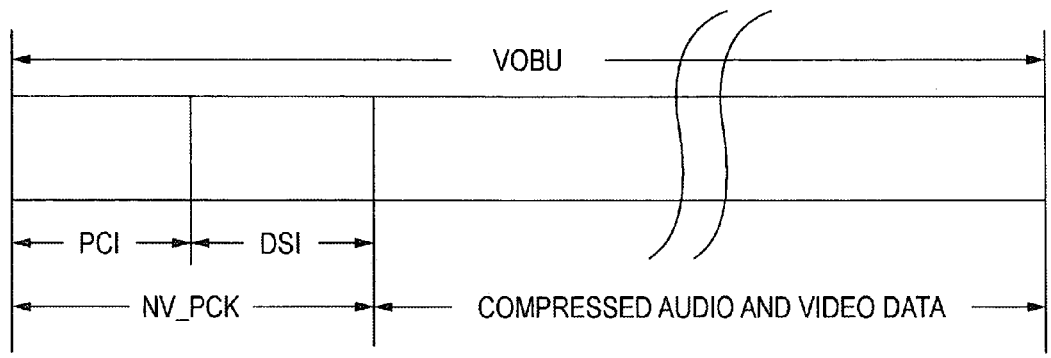
FIG. 2 is a diagram illustrating VOBU of a DVD-Video standard.

The data, which is acquired from the optical disk 101 by the data acquiring unit 102 and held in the data holding unit 103, has a data structure VOBU shown in FIG. 2. The VOBU has a header which includes management information called NV_PCK, and the control unit 105 refers to NV_PCK from the data holding unit 103. Further, a compressed data portion of the VOBU is transmitted to the DVD decoder 104, and the image display unit 107 outputs the video and the audio according to the setting of the control unit 105.

The NV_PCK includes two pieces of information of DSI and PCI. Information related to the current VOBU is described in the PCI, and the PCI includes PCI_GI, NSML_AGLI, HLI, and RECI, as shown in FIG. 3. The PCI_GI includes NV_PCK_LBN, VOBU_CAT, VOBU_UOP_CTL, VOBU_S_PTM, VOBU_E_PTM, VOBU_SE_E_PTM, and C_ELTM, as shown in FIG. 4. Further, the DSI includes DSI_GI, SML_PBI, SML_AGLI, VOBU_SRI, and SYNCI, as shown in FIG. 5.

The control unit 105 refers to VOBU_SRI from the data holding unit 103, and outputs the acquiring request of a VOBU to be subsequently reproduced to the data acquiring unit 102 to perform continuous reproducing.

Further, the video reproducing apparatus can performs double speed reproducing of the video and audio in a forward or backward direction. The VOBU_SRI has a structure shown in FIG. 6, and a start address of a next VOBU is described in the FWDI Next, a start address of a VOBU after 0.5 second is described in FWDI 1, a start address of a VOBU after 1.0 second is described in FWDI 2, and a start address of a VOBU is described for every 0.5 second. When the double speed reproducing is performed, the video and the audio are sequentially reproduced by using VOBU_SRI, and thus double speed reproducing can be performed.

Figure 12:
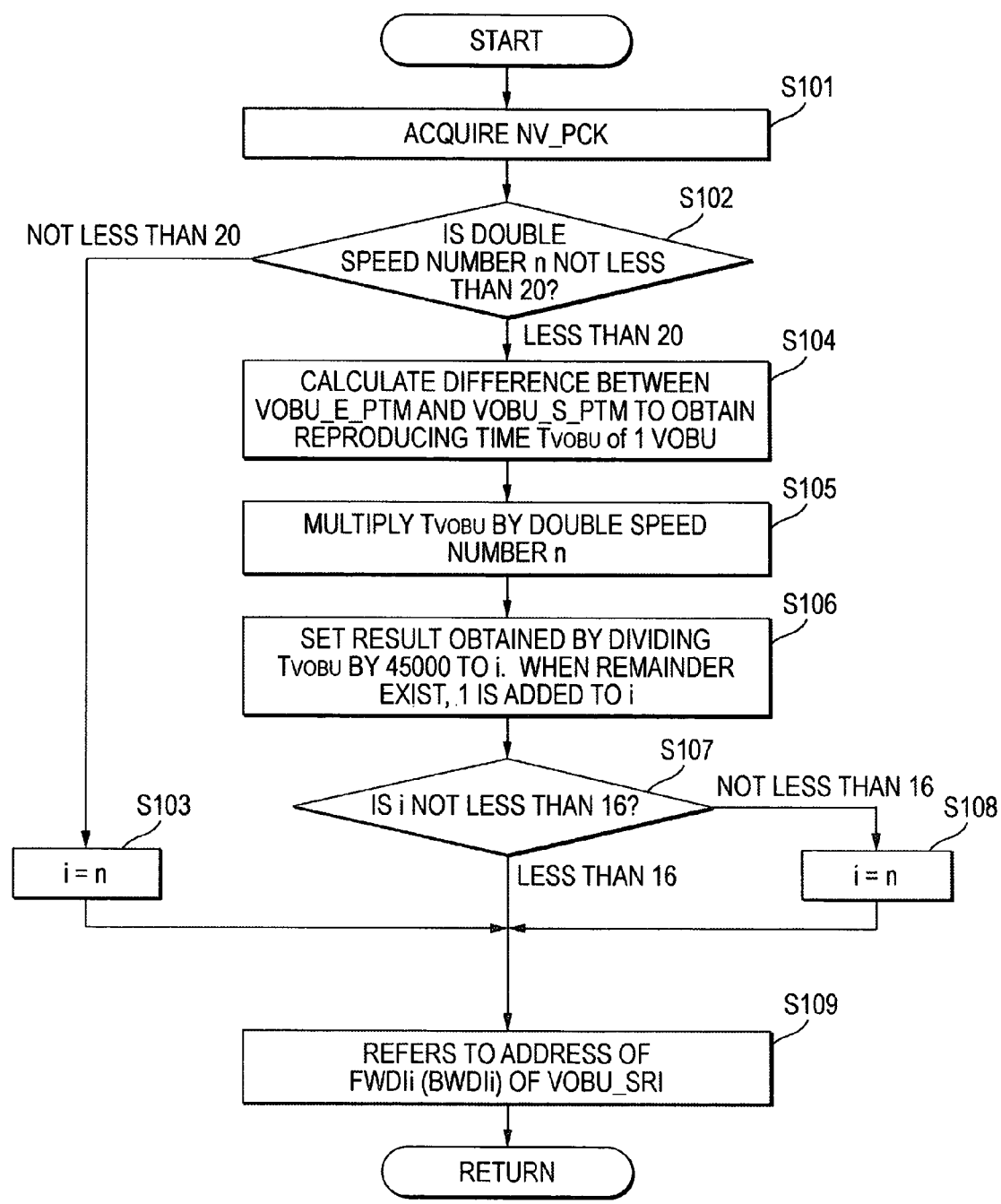
FIG. 12 is a diagram illustrating a reproducing method according to a first embodiment of the invention.

FIG. 12 is a block diagram illustrating a method of reproducing video according to a first embodiment of the invention, which schematically illustrates process contents executed in the control unit 105 of the video reproducing apparatus shown in FIG. 1. In FIG. 12, if the data acquiring unit 102 holds a VOBU acquired from the optical disk 101 in the data holding unit, a series of processes start from the process S101.

In the process S101, the control unit 105 acquires NV_PCK from the data holding unit. In the process S102, it is determined whether the designated double speed number n is not less than 20. When it is determined that the double speed number n is not less than 20, the process proceeds to the process S103, and when it is determined that the double speed number n is less than 20, the process proceeds to the process S104. In the process S103, the designated double speed number n is set to i. In the process S104, the difference between VOBU_S_PTM and VOBU_E_PTM is calculated, and a total reproducing time TVOBU of one VOBU is calculated. In the process S105, the TVOBU calculated in the process S104 is multiplied by the double speed number n to calculate a time TJUMP to the jump destination. In the process S106, the value of TJUMP is divided by 45000 indicating 0.5 second by the PTM, and the quotient of the obtained value is set to i. When the remainder exists, a value 1 is added to i. In the process S107, the value of i is determined. When the value of i is not less than 16, the process proceeds to the process S108, and when the value of i is less than 16, the process proceeds to the process S109. In the process S108, the originally designated double speed number n is substituted for i. In the process S109, the value of VOBU_SRI is referred to. In this case, when forward reproducing is performed, the process is completed by referring to the FWDI i, and when backward reproducing is performed, the process is completed by referring to BWDI i. The control unit 105 requires that the data acquiring unit 102 acquires the VOBU from the start address of the VOBU obtained in the process S109. By repeating the above-described processes S101 to S109, an intermittent reproducing process is performed, which achieves double speed reproducing.

Second Embodiment

Figure 13:
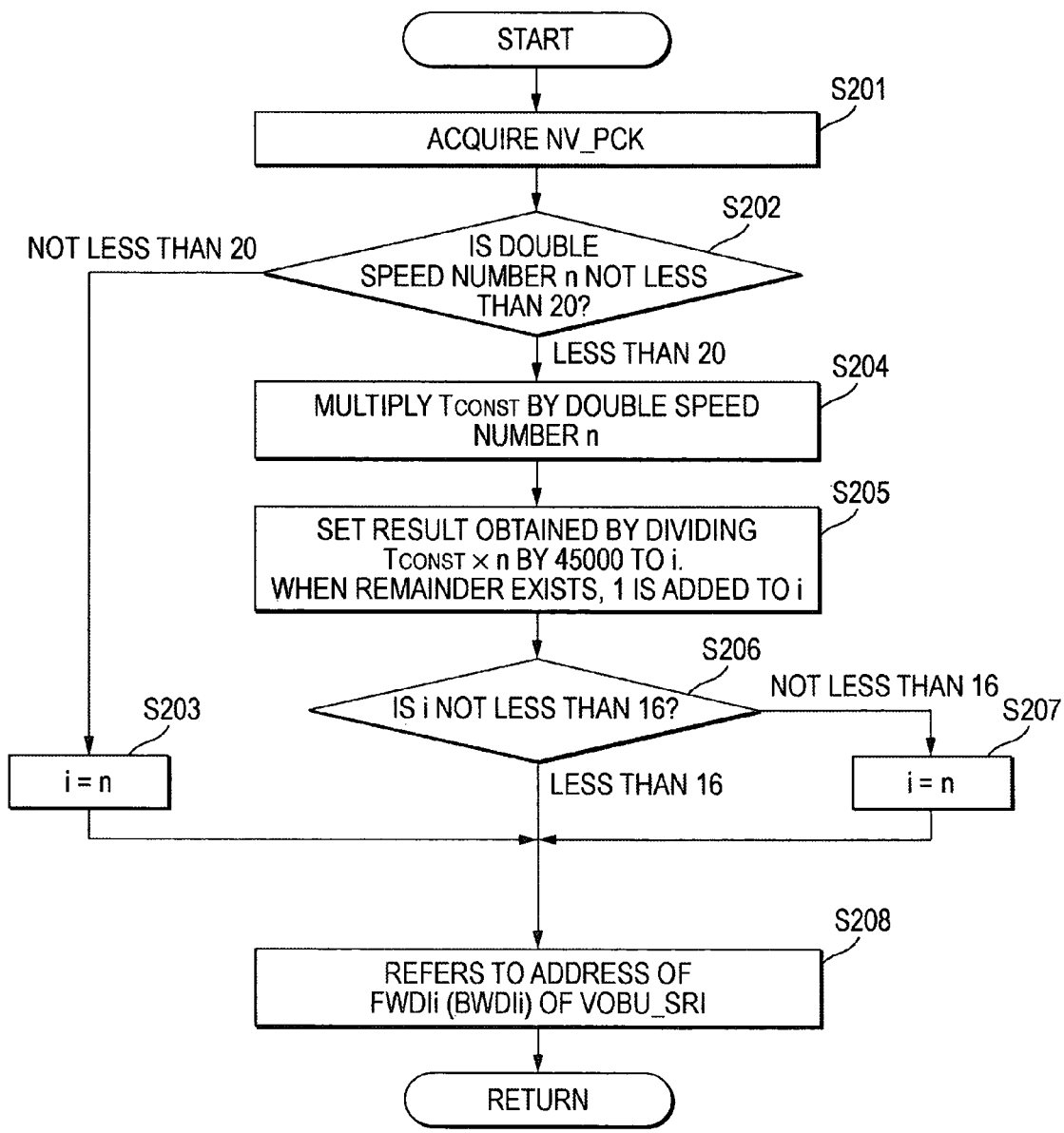
FIG. 13 is a diagram illustrating a reproducing method according to a second embodiment of the invention.

In the first embodiment, a total reproducing time of one VOBU is calculated from the data of the VOBU, but in the second embodiment, the reproducing time of the VOBU is set to the fixed value of the image output time. FIG. 13 is a block diagram illustrating a method of reproducing video according to a second embodiment of the invention, which schematically illustrates process contents executed in the control unit 105 of the video reproducing apparatus shown in FIG. 1.

In FIG. 13, if the VOBU acquired from the optical disk 101 by the data acquiring unit 102 is held in the data holding unit, a series of processes start from the process S201. In the process S201, the control unit 105 acquires NV_PCK from the data holding unit. In the process S202, it is determined whether the designated double speed number n is not less than 20. When it is determined that the double speed number n is not less than 20, the process proceeds to the process S203, and when it is determined that the double speed number n is less than 20, the process proceeds to the process S204. In the process S203, the designated double speed number n is set to i. In the process S204, the fixed value $T_{CONST}$ of the image output time is multiplied by the double speed number n, and a time $T_{JUMP}$ to the jump destination is calculated. In the process S205, the value of $T_{JUMP}$ is divided by 45000 indicating 0.5 second by the PTM, and the quotient of the obtained value is set to i. When the remainder exists, a value 1 is added to i. In the process S206, the value of i is determined. When the value of i is not less than 16, the process proceeds to the process S207, and when the value of i is less than 16, the process proceeds to the process S208. In the process S207, the originally designated double speed number n is substituted for i. In the process S208, the value of VOBU_SRI is referred to. In this case, when forward reproducing is performed, the process is completed by referring to FWDI i, and when backward reproducing is performed, the process is completed by referring to BWDI i. The control unit 105 requires that the data acquiring unit 102 acquires the VOBU from the start address of the VOBU acquired by the process S208. By repeating the above-described processes S201 to S208, an intermittent reproducing process is performed, which achieves double speed reproducing.

Third Embodiment

Figure 7:
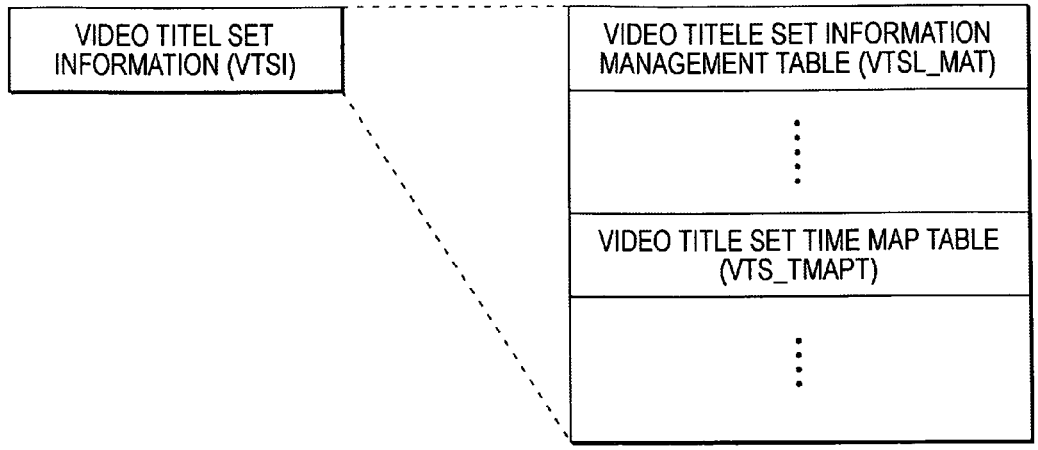
FIG. 7 is a diagram illustrating VTSI of a DVD-Video standard.
Figure 8:
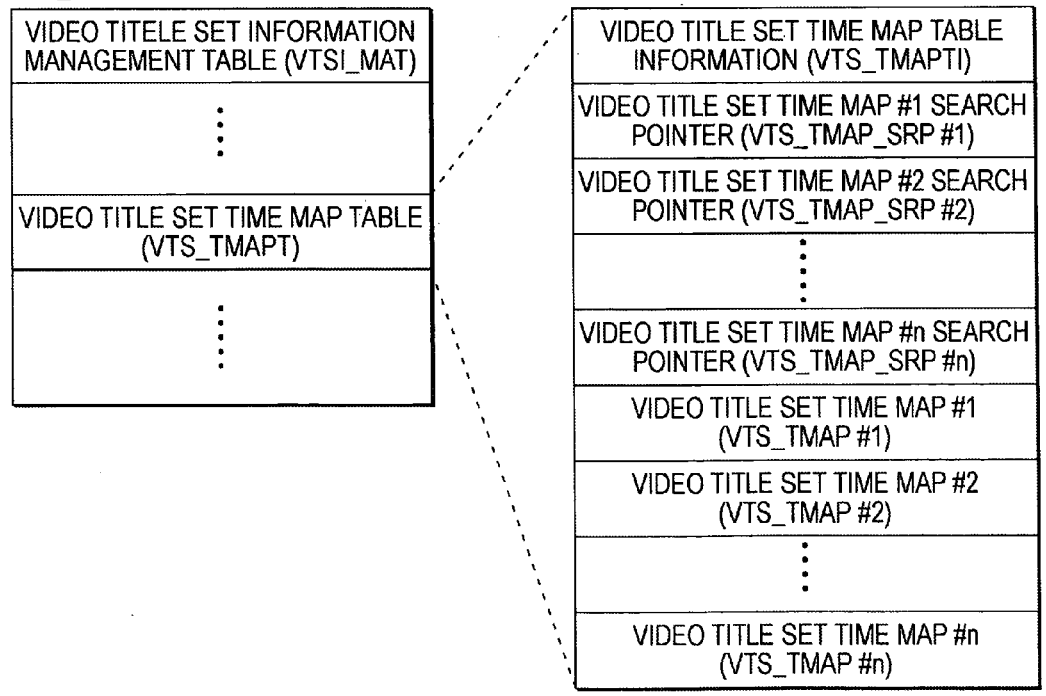
FIG. 8 is a diagram illustrating VTS_TMAPTI included in VTSI.

In the third embodiment, in order to acquire the time information, the management information VTS_TMAP (video title set time map) is used. The VTS_TMAP exists in the management information VTSI (video title set information). As shown in FIG. 7, the header of the VTSI has VTSI_MAT, and VTS_TMAPT used in the third embodiment. As shown in FIG. 8, the header of the VTSI_TMAPT has VTS_TMAPTI. As shown in FIG. 9, the VTS_TMAPTI is constructed by the number of the time map (VTS_TMAP_Ns) and the final address of VTS_TMAP (VTS_TMAPT_EA). Then, VTS_T-MAP_SRP is subsequent. As shown in FIG. 10, the start address of VTS_TMAP (VTS_TMAP_SA) is described. The necessary VTS_TMAP is selected from the VTS_TAMP_SRP. As shown in FIG. 11, the VTS_TMAP includes a time unit TMU, the entry number of the map MAP_EN_Ns, and a table of the map entry MAP_ENT.

Figure 14:
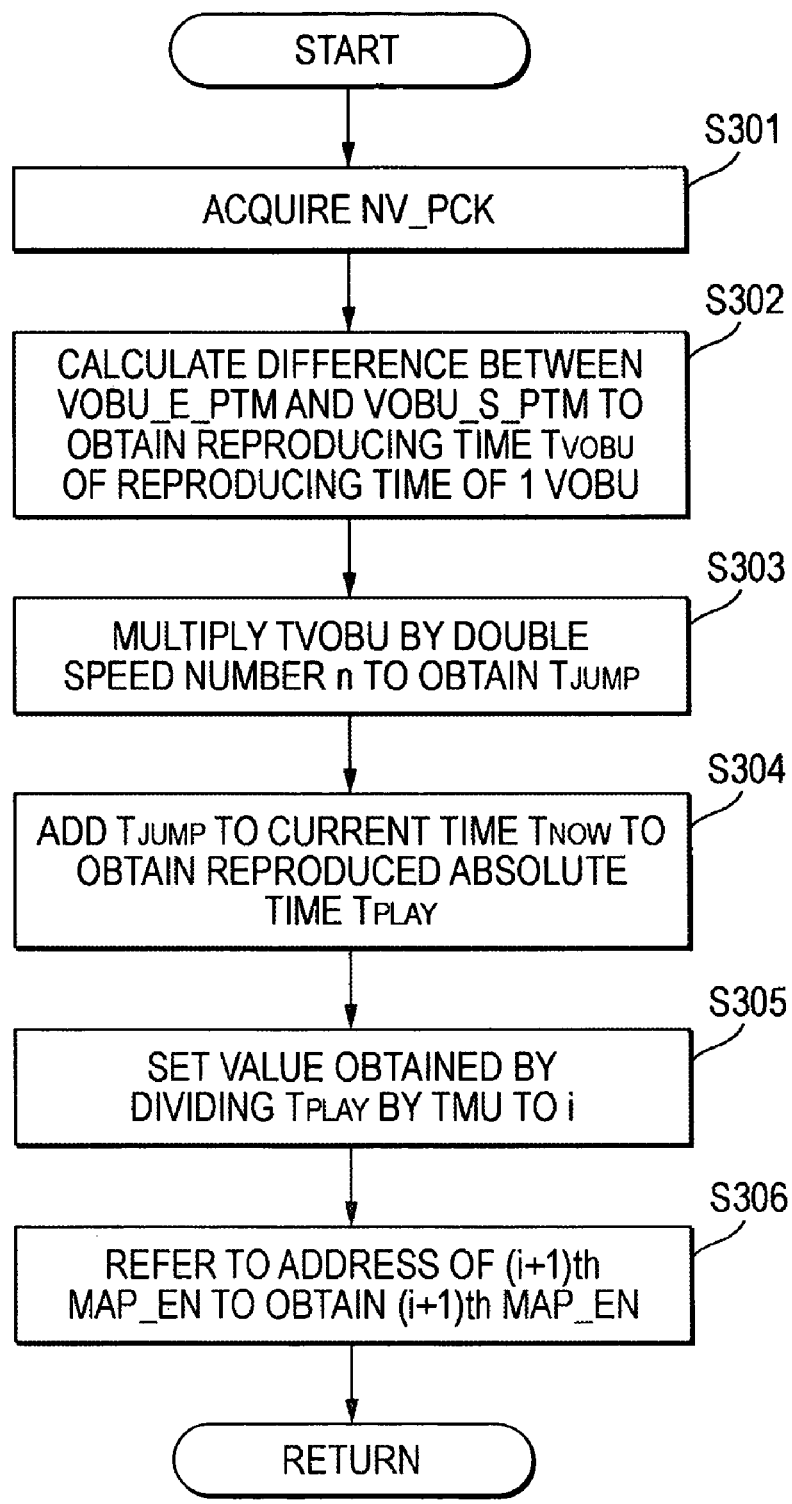
FIG. 14 is a diagram illustrating a reproducing method according to a third embodiment of the invention.

FIG. 14 is a block diagram illustrating a method of reproducing video according to a third embodiment of the invention, which schematically illustrates process contents executed in the control unit 105 of the video reproducing apparatus shown in FIG. 1. In FIG. 14, if the data acquiring unit 102 holds the VOBU obtained from the optical disk 101 in the data holding unit, a series of processes start from the process S301.

In the process S301, the control unit 105 acquires NV_PCK from the data holding unit. In the process S302, the difference between the VOBU_S_PTM and VOBU_E_PTM is calculated, and a total reproducing time TVOBU of one VOBU is calculated. In the process S303, the TVOBU calculated in the process S302 is multiplied by the double speed number n, and a time $T_{JUMP}$ to the jump destination is calculated. In the process S304, a sum between the $T_{JUMP}$ and the current time $T_{NOW}$ (the difference at the time of backward reproducing) is calculated, and the reproduced absolute time $T_{PLAY}$ is calculated. In the process S305, the time of $T_{PLAY}$ is divided by TMU, and the quotient is set to i. In the process S306, the (i+1)th MAP_EN is acquired from the MAP_ENT, and the process is completed. The control unit 105 requires that the data acquiring unit 102 acquires the VOBU from the start address of the VOBU obtained in the process S306. By repeating the above-described processes S301 to S306, an intermittent reproducing process is performed, which achieves double speed reproducing.

Fourth Embodiment

Figure 15:
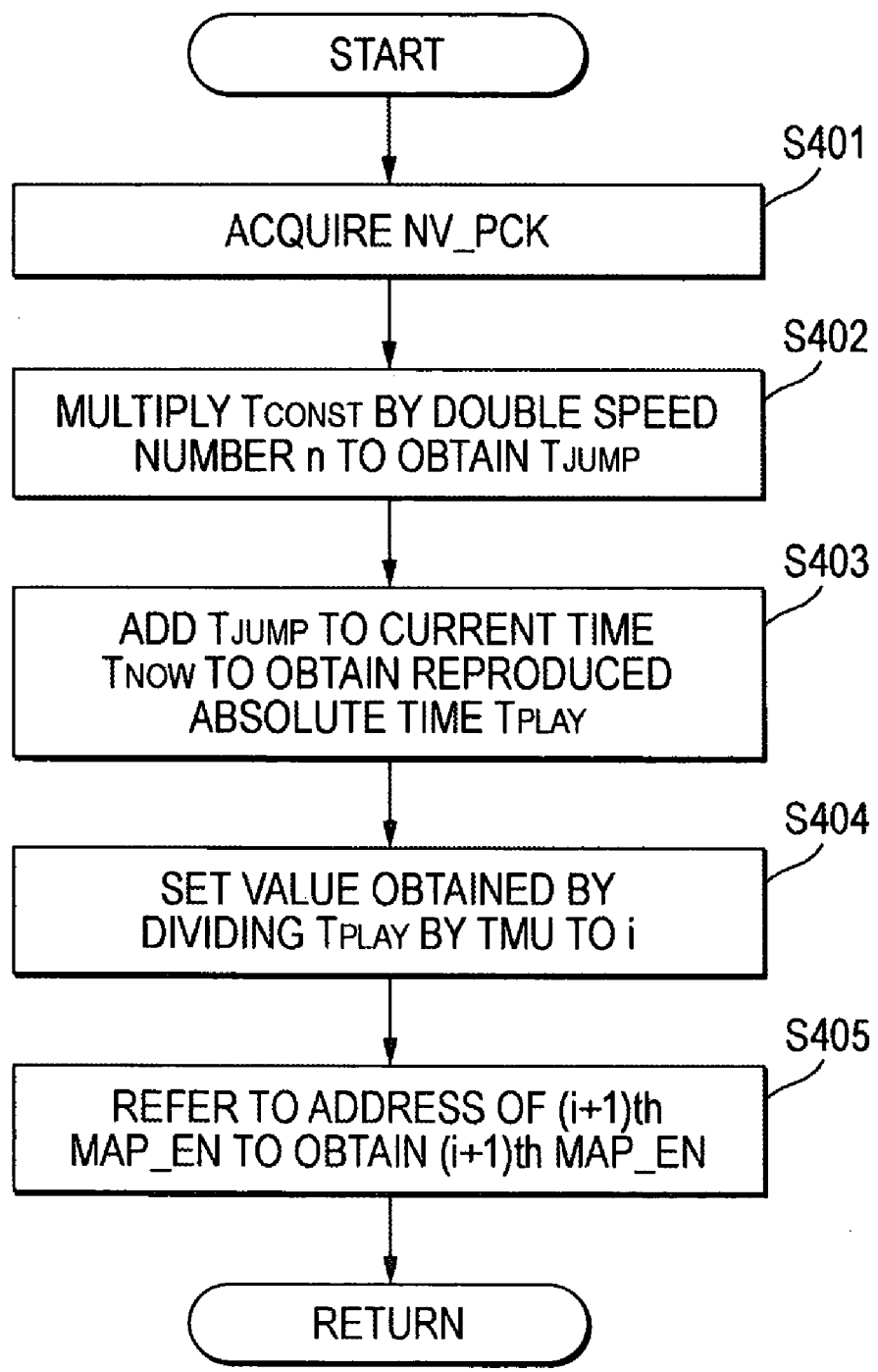
FIG. 15 is a diagram illustrating a reproducing method according to a fourth embodiment of the invention.

In the third embodiment, a total reproducing time of one VOBU is calculated from the data of the VOBU, but in the fourth embodiment, the reproducing time of the VOBU is set to the fixed value of the image output time. FIG. 15 is a block diagram illustrating a method of reproducing an image according to a fourth embodiment of the invention, which schematically illustrates process contents executed in the control unit 105 of the video reproducing apparatus shown in FIG. 1.

In FIG. 15, if the VOBU acquired from the optical disk 101 by the data acquiring unit 102 is held in the data holding unit, a series of processes start from the process S401. In the process S401, the control unit 105 acquires NV_PCK from the data holding unit. In the process S402, the fixed value $T_{CONST}$ of the image output time is multiplied by the double speed number n, and a time $T_{JUMP}$ to the jump destination is calculated. In the process S403, a sum between the $T_{JUMP}$ and the current time $T_{NOW}$ (the difference at the time of backward reproducing) is calculated, and the reproduced absolute time $T_{PLAY}$ is calculated. In the process S404, the time of TPLAY is divided by TMU, and the quotient is set to i. In the process S405, the (i+1)th MAP_EN is acquired from the MAP_ENT, and the process is completed. The control unit 105 requires that the data acquiring unit 102 acquires the VOBU from the start address of the VOBU obtained in the process S405. By repeating the above-described processes S401 to S405, an intermittent reproducing process is performed, which achieves double speed reproducing.

Fifth Embodiment

Figure 16:
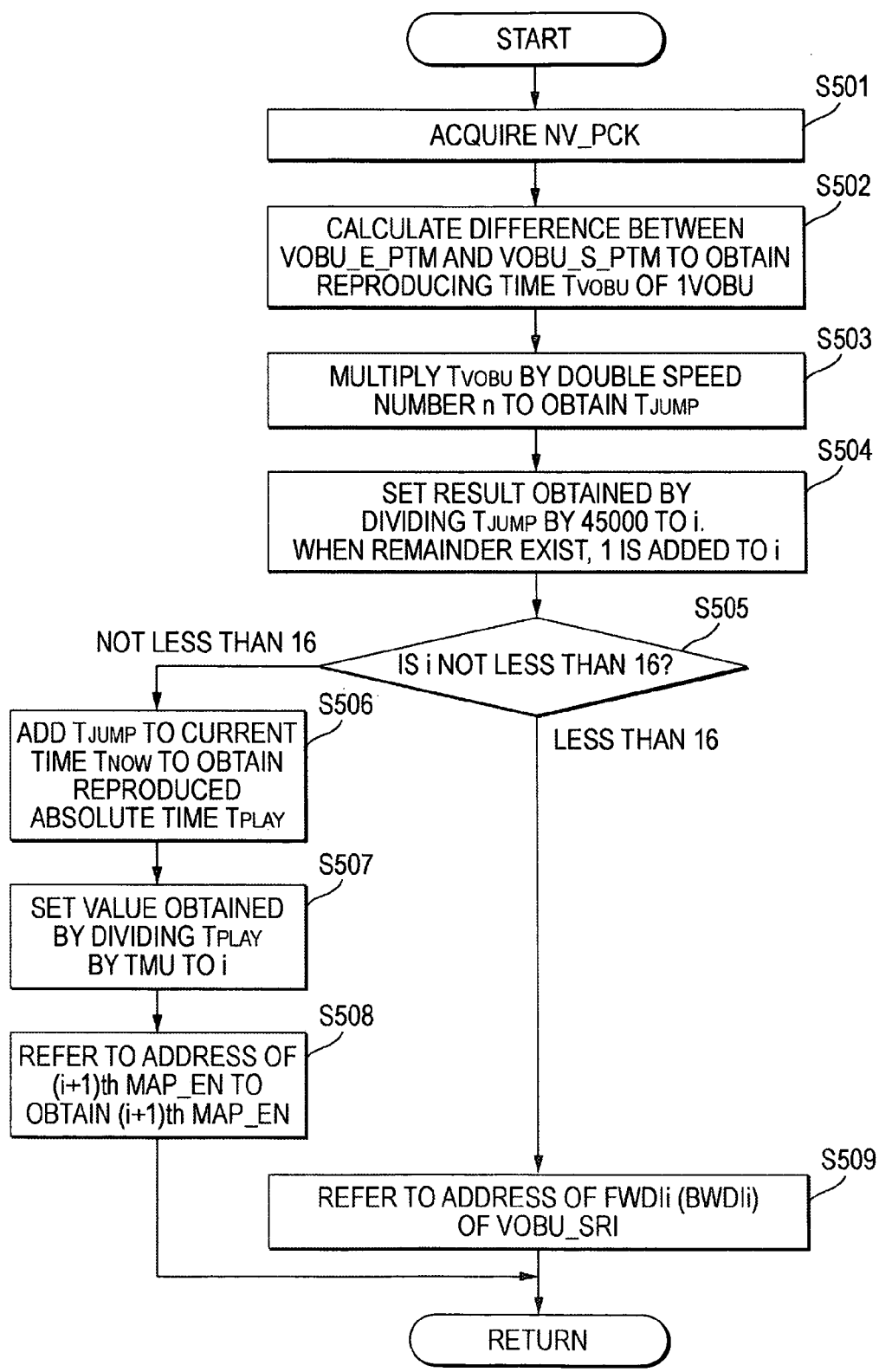
FIG. 16 is a diagram illustrating a reproducing method according to a fifth embodiment of the invention.

FIG. 16 is a block diagram illustrating a method of reproducing video according to a fifth embodiment of the invention, which schematically illustrates process contents executed in the control unit 105 of the video reproducing apparatus shown in FIG. 1. The fifth embodiment corresponds to a combination of the first embodiment and the third embodiment. In FIG. 16, if the data acquiring unit 102 holds the VOBU obtained from the optical disk 101 in the data holding unit, a series of processes start from the process S501.

In the process S501, the control unit 105 acquires NV_PCK from the data holding unit. In the process S502, the difference between the VOBU_S_PTM and VOBU_E_PTM is calculated, and a total reproducing time $T_{VOBU}$ of one VOBU is calculated. In the process S503, the $T_{VOBU}$ calculated in the process S502 is multiplied by the double speed number n, and a time $T_{JUMP}$ to the jump destination is calculated. In the process S504, the value of $T_{JUMP}$ is divided by a value 45000 obtained by converting 0.5 second into the PTM, and the quotient is set to i. When the remainder exists, a value 1 is added to i. In the process S505, the value of i is determined. When the value of i is not less than 16, the process proceeds to the process S506, and when the value of i is less than 16, the process proceeds to the process S509. In the process S506, the difference between the $T_{JUMP}$ obtained in the process S503 and the current time $T_{NOW}$ is calculated, and the reproduced absolute time $T_{PLAY}$ is calculated. In the process S507, the time of the $T_{PLAY}$ is divided by the TMU, and the quotient is set to i. In the process S508, the (i+1)th MAP_EN is acquired from the MAP_ENT, and the process is completed. In the process S509, on the basis of the value of i calculated in the process S504, the value of VOBU_SRI is referred to. In this case, when forward reproducing is performed, the process is completed by referring to the FWDI i, and when backward reproducing is performed, the process is completed by referring to the BWDI i. The control unit 105 requires that the data acquiring unit 102 acquires the VOBU from the start address of the VOBU obtained in the process S508 or the process S509. By repeating the above-described processes S501 to S509, an intermittent reproducing process is performed, which achieves double speed reproducing.

Sixth Embodiment

Figure 17:
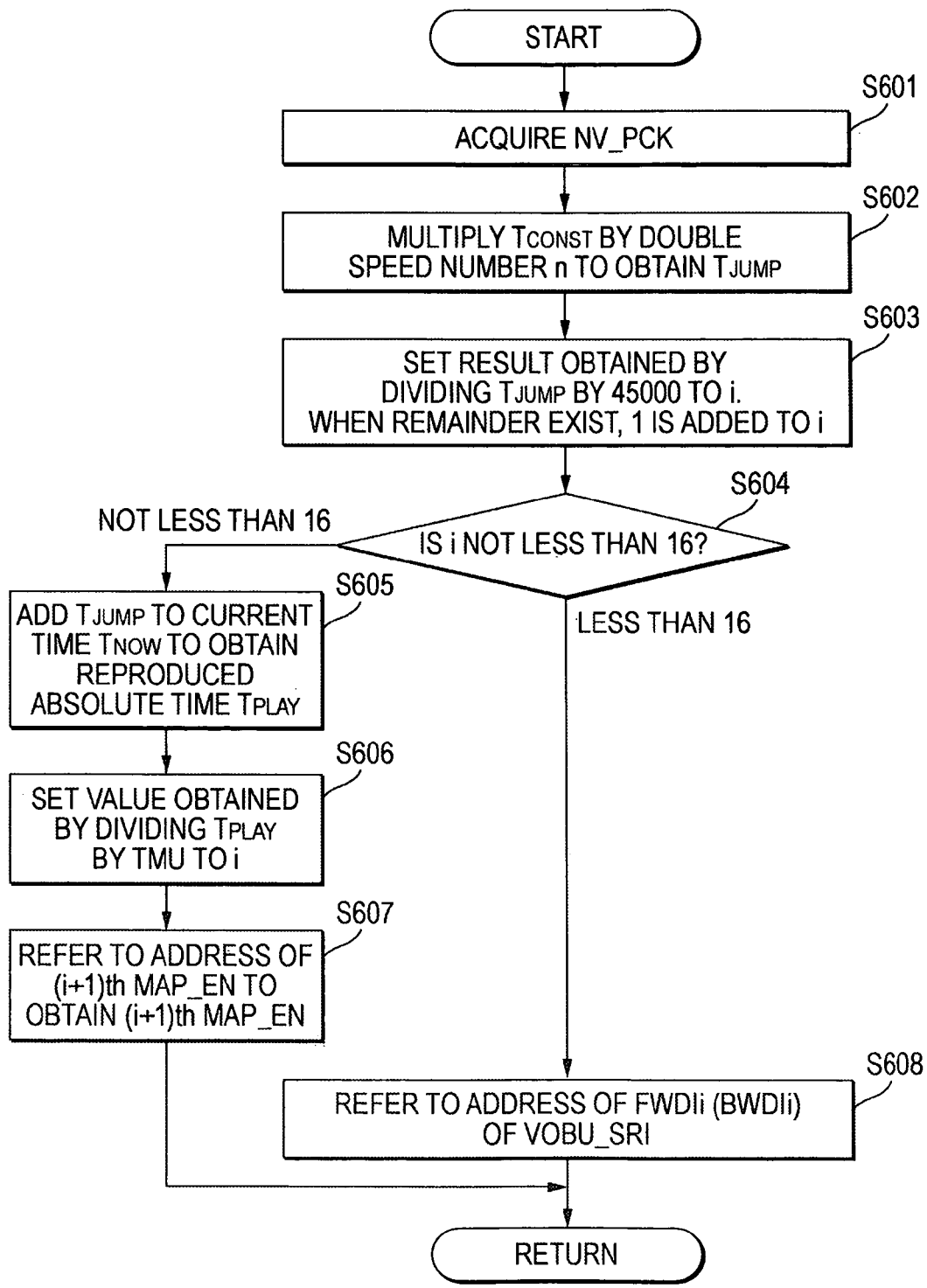
FIG. 17 is a diagram illustrating a reproducing method according to a sixth embodiment of the invention.

FIG. 17 is a block diagram illustrating a method of reproducing video according to a sixth embodiment of the invention, which schematically illustrates process contents executed in the control unit 105 of the video reproducing apparatus shown in FIG. 1. The sixth embodiment corresponds to a combination of the second embodiment and the fourth embodiment. In FIG. 17, if the data acquiring unit 102 holds the VOBU obtained from the optical disk 101 in the data holding unit, a series of processes start from the process S601. In the process S601, the control unit 105 acquires NV_PCK from the data holding unit.

In the process S602, the fixed value $T_{CONST}$ of the image output time is multiplied by the double speed number n, and a time $T_{JUMP}$ to the jump destination is calculated. In the process S603, the value of $T_{JUMP}$ is divided by a value 45000 obtained by converting 0.5 second into the PTM, and the quotient is set to i. When the remainder exists, a value 1 is added to i. In the process S604, the value of i is determined. When the value of i is not less than 16, the process proceeds to the process S605, and when the value of i is less than 16, the process proceeds to the process S608. In the process S605, the difference between the $T_{JUMP}$ obtained in the process S602 and the current time $T_{NOW}$ is calculated, and the reproduced absolute time $T_{PLAY}$ is calculated. In the process S606, the time of the $T_{PLAY}$ is divided by the TMU, and the quotient is set to i. In the process S607, the (i+1)th MAP_EN is acquired from the MAP_ENT, and the process is completed. In the process S608, on the basis of the value of i calculated in the process S603, the value of VOBU_SRI is referred to. In this case, when forward reproducing is performed, the process is completed by referring to the FWDI i, and when backward reproducing is performed, the process is completed by referring to the BWDI i. The control unit 105 requires that the data acquiring unit 102 acquires the VOBU from the start address of the VOBU obtained in the process S607 or the process S608. By repeating the above-described processes S601 to S608, an intermittent reproducing process is performed, which achieves double speed reproducing.

Figure 18:
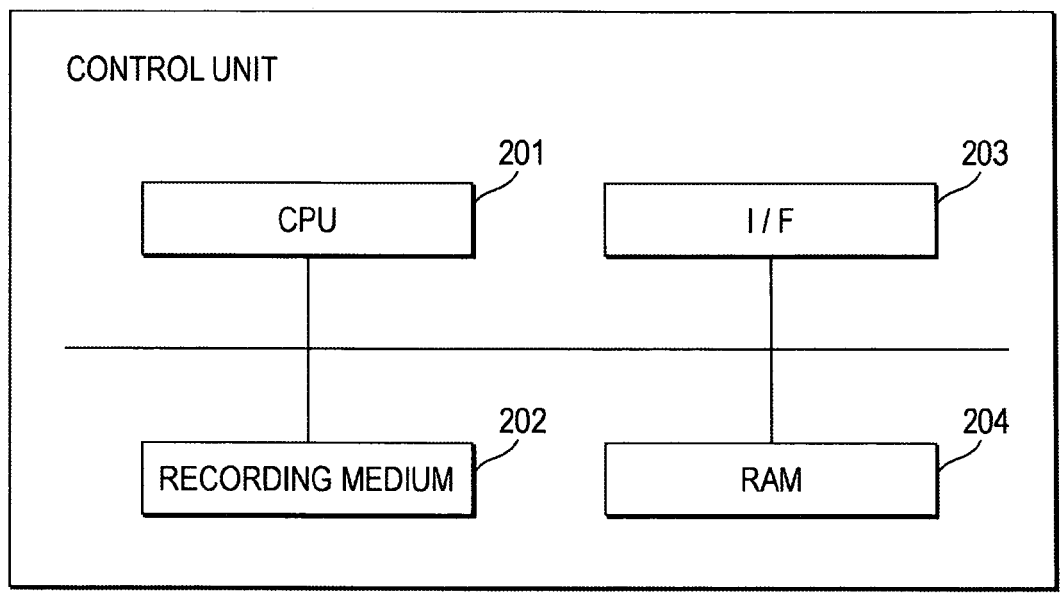
FIG. 18 is a diagram illustrating a control unit of a video reproducing apparatus according to an embodiment of the invention.

FIG. 18 is a schematic diagram illustrating a physical structure of the control unit 105 in the above-described first to sixth embodiments. The function of the control unit 105 can be achieved by reading program codes stored in the recording medium 202 or the RAM 204 by the built CPU 201. The I/F 203 performs data transmission and reception together with a DVD decoder 104, the input device 106, and the optical disk 101.

The recording medium in which program codes of the software achieving the functions according to the embodiments of the invention are recorded is supplied to the system or the apparatus, and the program codes that are stored in the recording medium by the CPU of the supplied system or the apparatus are read out and executed, which results in achieving the functions according to the embodiments of the invention. In this case, the program codes read out from the recording medium achieve the functions according to the embodiments of the invention, and thus the recording medium in which the program codes are recorded achieves the functions according to the embodiments of the invention. As the recording medium 202, for example, a non-volatile memory, a ROM, a hard disk, an optical disk, a CD-ROM, a CD-R, a floppy disk, or the like may be used.

In order to expand or modify the functions, a portion or all of the program codes may be rewritten. Instead of the optical disk 101, an updating disk is frequently used in which the program codes for achieving the functions according to the embodiments of the invention are recorded. The program codes that are read out by the updating disk may be stored in the recording medium 202. Therefore, the updating disk in which the program codes are recorded also can form the embodiment of the invention.

In the method of reproducing video and audio and the apparatus thereof according to the invention, when the video data and the audio data recorded in the recording medium according to the DVD-Video standard are reproduced and outputted at a fast speed in a forward or backward direction, the reproducing time of the VOBU is acquired from the management information, or the reproducing time of the VOBU is fixed, and thus the accurate exponent can be calculated for obtaining the address of the VOBU to be subsequently reproduced. Therefore, even when the reproducing time of the VOBU is not constant, the accurate reproducing speed can be obtained. Further, the method of reproducing video and audio and the apparatus thereof according to the invention can be used as a method of reproducing video and audio and an apparatus thereof in which video data or audio data recorded in a recording medium, such as an optical disk, is reproduced and outputted at a fast speed in a forward direction or a backward direction.

What is claimed is:

1. A video and audio reproducing apparatus that performs double speed reproducing of video and audio on the basis of the designated double speed number of recorded data according to a DVD-Video standard, the video and audio reproducing apparatus comprising:
a correcting unit that corrects the designated double speed number according to a ratio of a reproducing time of a VOBU (Video Object Unit) calculated from the difference between VOBU_E_PTM and VOBU_S_PTM included in the VOBU of the recorded data, and a standard reproducing time; and
a VOBU acquiring unit that refers to an address of VOBU_SRI included in the VOBU of the recorded data by representing a correction value of the designated double speed number as an exponent, and acquires a VOBU to be subsequently reproduced.

2. The video and audio reproducing apparatus according to claim 1, further comprising:
an absolute time calculating unit that calculates an absolute time of a VOBU to be subsequently reproduced from a value obtained by multiplexing a reproducing time of a VOBU calculated from the difference between VOBU_E_PTM and VOBU_S_PTM included in the VOBU of the recorded data by the designated double speed number, and a current passage time; and
a VOBU acquiring unit that refers to an address of MAP_EN of MAP_ENT included in VTSI of the recorded data by representing a value obtained by dividing the absolute time of the VOBU by TMU included in the VTSI of the recorded data as an exponent, and acquires a VOBU to be subsequently reproduced.

3. A video and audio reproducing apparatus that performs double speed reproducing of video and audio on the basis of the designated double speed number of recorded data according to a DVD-Video standard, the video and audio reproducing apparatus comprising:
a correcting unit that corrects the designated double speed number according to a ratio of a fixed value given as a reproducing time of a VOBU (Video Object Unit) and a standard reproducing time; and
a VOBU acquiring unit that refers to an address of VOBU_SRI included in the VOBU of the recorded data by representing a correction value of the designated double speed as an exponent, and acquires a VOBU to be subsequently reproduced.

4. The video and audio reproducing apparatus according to claim 3, further comprising:
an absolute time calculating unit that calculates an absolute time of a VOBU to be subsequently reproduced from a value obtained by multiplexing a fixed value given as a reproducing time of a VOBU by the designated double speed number, and a current passage time; and
a VOBU acquiring unit that refers to MAP_EN of MAP_ENT included in VTSI of the recorded data by representing a value obtained by dividing the absolute time of the VOBU by TMU included in the VTSI of the recorded data as an exponent, and acquires a VOBU to be subsequently reproduced.

5. A video and audio reproducing apparatus that performs double speed reproducing of video and audio on the basis of the designated double speed number of recorded data according to a DVD-Video standard, the video and audio reproducing apparatus comprising:
an absolute time calculating unit that calculates an absolute time of a VOBU (Video Object Unit) to be subsequently reproduced from a value obtained by multiplexing a reproducing time of a VOBU calculated from the difference between VOBU_E_PTM and VOBU_S_PTM included in the VOBU of the recorded data by the designated double speed number, and a current passage time; and
a VOBU acquiring unit that refers to an address of MAP_EN of MAP_ENT included in VTSI of the recorded data by representing a value obtained by dividing the absolute time of the VOBU by TMU included in the VTSI of the recorded data as an exponent, and acquires a VOBU to be subsequently reproduced.

6. A video and audio reproducing apparatus that performs double speed reproducing of video and audio on the basis of the designated double speed number of recorded data according to a DVD-Video standard, the video and audio reproducing apparatus comprising:
an absolute time calculating unit that calculates an absolute time of a VOBU (Video Object Unit) to be subsequently reproduced from a value obtained by multiplexing a fixed value given as a reproducing time of a VOBU by the designated double speed number, and a current passage time; and a VOBU acquiring unit that refers to MAP_EN of MAP_ENT included in VTSI of the recorded data by representing a value obtained by dividing the absolute time of the VOBU by TMU included in the VTSI of the recorded data as an exponent, and acquires a VOBU to be subsequently reproduced.

7. The video and audio reproducing apparatus according to claim 1, 3, 5 or 6,
wherein, in a state where a correction value of the designated double speed number is represented as an exponent, when the exponent does not exist in VOBU_SRI included in a VOBU, a unit is selected.

8. The video and audio reproducing apparatus according to claim 1, 3, 5 or 6,
wherein the VOBU acquiring unit acquires the VOBU to be subsequently reproduced when a correction value of the designated double speed number represented as the exponent is not less than 16.

9. An integrated circuit of a video and audio reproducing apparatus in which double speed reproducing of video and audio is performed on the basis of the designated double speed number of recorded data according to a DVD-Video standard,
wherein the integrated circuit is included in the video and audio reproducing apparatus according to claim 1, 3, 5 or 6.

10. A method of reproducing video and audio that performs double speed reproducing of video and audio on the basis of the designated double speed number of recorded data according to a DVD-Video standard, the method comprising the steps of:
correcting the designated double speed number according to a ratio of a reproducing time of a VOBU (Video Object Unit) calculated from the difference between VOBU_E_PTM and VOBU_S_PTM included in the VOBU of the recorded data, and a standard reproducing time; and
referring to an address of VOBU_SRI included in the VOBU of the recorded data by representing a correction value of the designated double speed as an exponent so as to acquire a VOBU to be subsequently reproduced.

11. A method of reproducing video and audio that performs double speed reproducing of video and audio on the basis of the designated double speed number of recorded data according to a DVD-Video standard, the method comprising the steps of:
correcting the designated double speed number according to a ratio of a fixed value given as a reproducing time of a VOBU (Video Object Unit), and a standard reproducing time; and
referring to an address of VOBU_SRI included in the VOBU of the recorded data by representing a correction value of the designated double speed number as an exponent to acquire a VOBU to be subsequently reproduced.

12. A method of reproducing video and audio that performs double speed reproducing of video and audio on the basis of the designated double speed number of recorded data according to a DVD-Video standard, the method comprising the steps of:
calculating an absolute time of a VOBU (Video Object Unit) to be subsequently reproduced from a value obtained by multiplexing a reproducing time of a VOBU calculated from the difference between VOBU_E_PTM and VOBU_S_PTM included in the VOBU of the recorded data by the designated double speed number, and a current passage time; and
referring to an address of MAP_EN of MAP_ENT included in VTSI of the recorded data by representing a value obtained by dividing the absolute time of the VOBU by TMU included in the VTSI of the recorded data as an exponent so as to acquire a VOBU to be subsequently reproduced.

13. A method of reproducing video and audio that performs double speed reproducing of video and audio on the basis of the designated double speed number of recorded data according to a DVD-Video standard, the method comprising of the steps of:
calculating an absolute time of a VOBU (Video Object Unit) to be subsequently reproduced from a value obtained by multiplexing a fixed value given as a reproducing time of a VOBU by the designated double speed number, and a current passage time; and
referring to MAP_EN of MAP_ENT included in VTSI of the recorded data by representing a value obtained by dividing the absolute time of the VOBU by TMU included in the VTSI of the recorded data as an exponent to acquire a VOBU to be subsequently reproduced.

14. The method of reproducing video and audio according to claim 10, 11, 12 or 13, further comprising a step of:
selecting a unit, when an exponent does not exist in VOBU_SRI included in a VOBU, in a state in which a correction value of the designated double speed number is represented as the exponent.

15. The method of reproducing video and audio according to claim 10, 11, 12 or 13,
wherein in the step of acquiring the VOBU, the VOBU to be subsequently reproduced is acquired, when a correction value of the designated double speed number represented as the exponent is less than 16.

16. A non-transitory recording medium having a program stored thereon that causes a computer to execute the respective steps of the method of reproducing video and audio according to claim 10, 11, 12, or 13.

* * * * *